(12) United States Patent
Krzesicki et al.

(10) Patent No.: US 6,711,968 B2
(45) Date of Patent: Mar. 30, 2004

(54) AXLE DIFFERENTIAL ASSEMBLY

(75) Inventors: Richard Michael Krzesicki, Ann Arbor, MI (US); Dennis Cook, Royal Oak, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/210,966

(22) Filed: Aug. 2, 2002

(65) Prior Publication Data

US 2004/0020325 A1 Feb. 5, 2004

(51) Int. Cl.$^7$ ............................................. F16H 48/12
(52) U.S. Cl. ....................................................... 74/650
(58) Field of Search ........................................... 74/650

(56) References Cited

U.S. PATENT DOCUMENTS

| | | |
|---|---|---|
| 4,805,486 A | 2/1989 | Hagiwara et al. |
| 4,895,236 A | 1/1990 | Sakakibara et al. |
| 5,019,021 A | 5/1991 | Janson |
| 5,092,825 A | 3/1992 | Goscenski, Jr. et al. |
| 5,279,401 A | 1/1994 | Stall |
| 5,423,235 A | 6/1995 | Botterill et al. |
| 5,562,192 A | 10/1996 | Dick |
| 5,699,888 A | * 12/1997 | Showalter ................. 192/35 |
| 6,012,560 A | * 1/2000 | Kuroda et al. ............. 192/35 |

* cited by examiner

*Primary Examiner*—Dirk Wright
(74) *Attorney, Agent, or Firm*—Brinks Hofer Gilson & Lione

(57) ABSTRACT

An axle differential assembly for an automotive vehicle includes a differential housing and a central shaft rotatably mounted within the differential housing. The central shaft has opposing first and second ends, includes a ring gear mounted thereon, and defines a central axis of the axle differential assembly. A pair clutch packs are mounted to each end of the central shaft. Each of the clutch packs is adapted to connect to an end of an axle half shaft and is adapted to selectively transfer rotational motion from the central shaft, across the clutch packs, and to the axle half shafts. A pair of actuators are adapte to exert an axial force onto the clutch packs.

11 Claims, 5 Drawing Sheets

AXLE DIFFERENTIAL ASSEMBLY

TECHNICAL FIELD

The present invention generally relates to an automotive axle differential. More specifically, the present invention relates to an automotive axle which uses a pair of ball screw actuated clutch packs to allow limited relative rotation between two axle half shafts of the automobile.

BACKGROUND

In an automotive vehicle, a differential gear assembly is used to transfer power from a rotating driveshaft to the axles and wheels of the vehicle. The rotating driveshaft of the vehicle engages a ring gear which is mounted onto a differential housing. The end of the driveshaft and the ring gear are adapted to transfer rotation from the drive shaft to the differential housing such that the differential housing rotates transverse to the driveshaft.

Typically, this type of differential includes a bevel gear type differential gear set which allows relative rotation between two axle half shafts. This type of bevel gear set includes many parts, and is relatively heavy. Further, it is sometimes desirable to prevent the two axle half shafts from relative rotation. In this instance, the differential assembly must include an additional device to lock the two axle half shafts together and prevent relative rotation therebetween.

Therefore, there is a need for an axle differential which will selectively allow relative rotation between two axle half shafts while minimizing the weight of the axle differential.

DETAILED DESCRIPTION

The following description of the preferred embodiments of the invention is not intended to limit the scope of the invention to these preferred embodiments, but rather to enable any person skilled in the art to make and use the invention.

Figure 1:
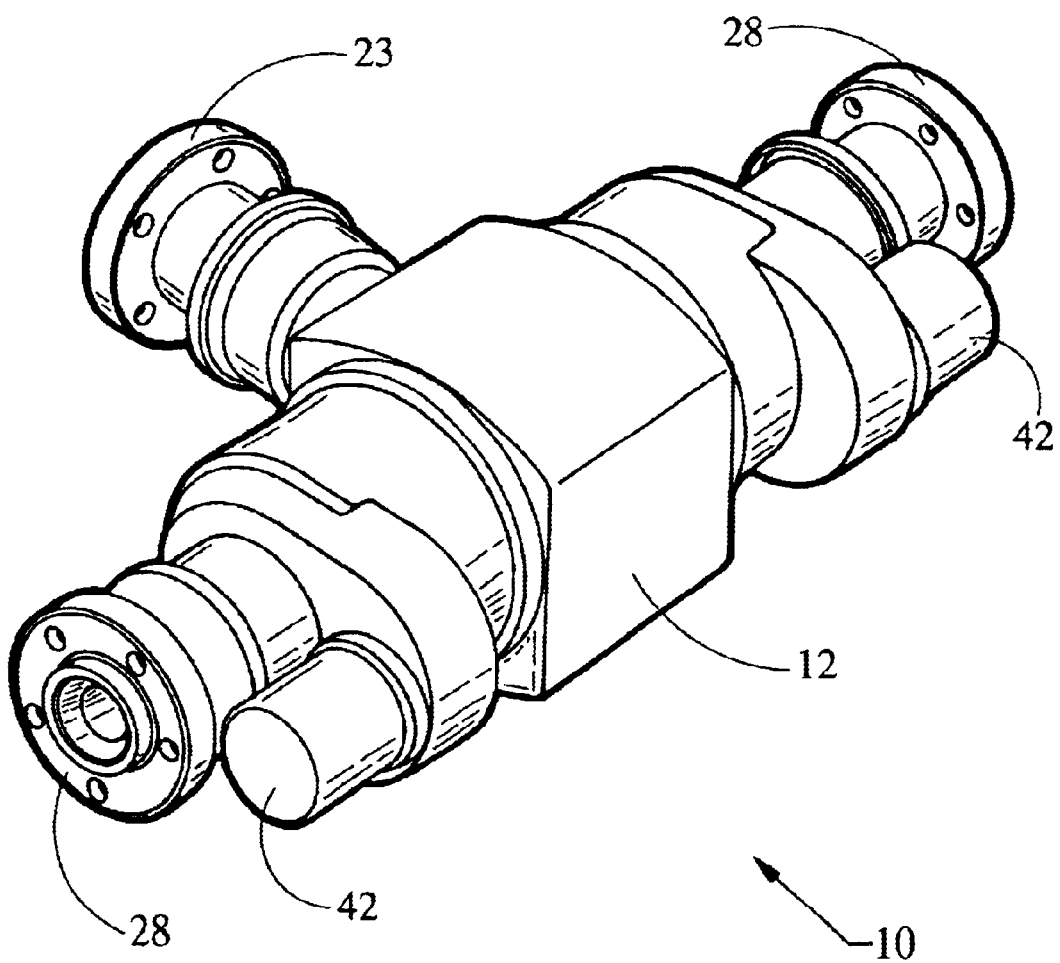
FIG. 1 is a perspective view of an axle differential assembly of a first preferred embodiment.
Figure 2:
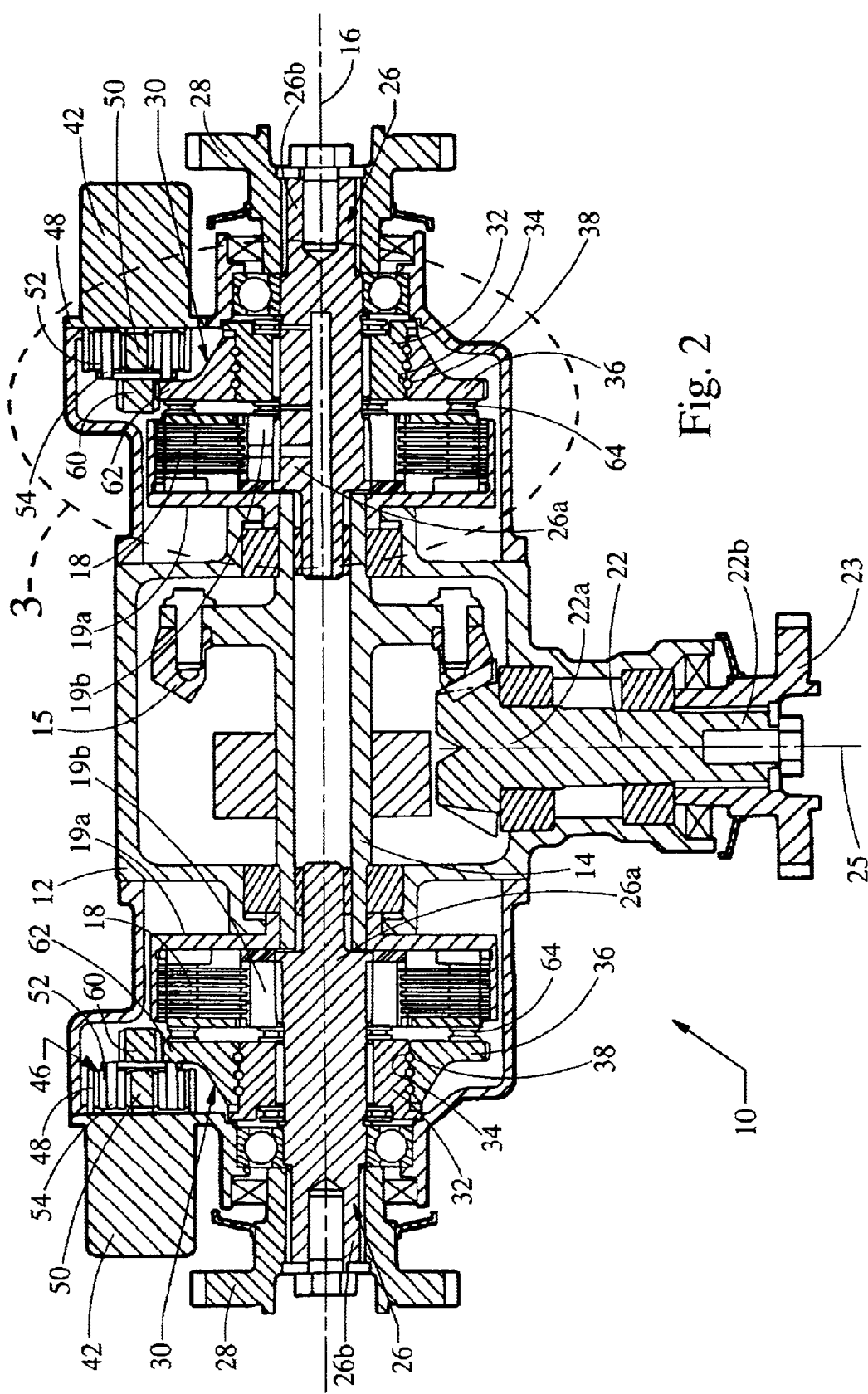
FIG. 2 is a sectional view taken along line 2—2 of FIG. 1.

Referring to FIG. 1, a differential axle assembly for an automotive vehicle is shown generally at 10. Referring to FIG. 2, the differential axle assembly 10 includes a differential housing 12 having a central shaft 14 rotatably mounted therein. The central shaft 14 includes opposing first and second ends and a ring gear 15 mounted thereon. The central shaft 14 defines a central axis 16 of the differential axle assembly 10.

A pair of clutch packs 18 are mounted within the differential housing 12, one clutch pack 18 being mounted to each of the first and second ends of the central shaft 14. The clutch packs 18 interconnect the central shaft 14 to opposing axle half shafts (not shown) of the vehicle. Preferably, each of the clutch packs 18 include a first section 19a and a second section 19b, a plurality of first plates 20 and a plurality of second plates 21. The first plates 20 include teeth formed within an inner diameter which engage corresponding teeth formed within an inner diameter of the first section 19b. The second plates 21 include teeth formed within an outer diameter which engage corresponding teeth formed within an outer diameter of the second section 19a. When an axial force is applied to the clutch pack 18, the first and second plates 20, 21 are forced together. If the force is sufficient, friction will prevent the first and second plates 20, 21 from relative rotation, thereby engaging the first and second sections 19a, 19b of the clutch pack 18 such that rotational motion is transferred across the clutch pack 18.

In the preferred embodiments, a prop shaft 22 is rotatably mounted within the differential housing 12. The prop shaft 22 is rotatable about a second axis 25 which is substantially perpendicular to the central axis 16 of the differential axle assembly 10. The prop shaft 22 includes a first end 22a which engages the ring gear 15 of the central shaft 14, and a second end 22b which includes a connector plate 23 that is adapted to connect to a drive shaft (not shown) of the vehicle. Therefore, rotational movement of the drive shaft of the vehicle is transferred through the prop shaft 22 to the ring gear 15 of the central shaft 14, thereby causing the central shaft 14 to rotate about the central axis 16.

Preferably, the differential axle assembly 10 includes a pair of connector shafts 26. One of the connector shafts 26 extends from the second section 19b of each of the clutch packs 18 and is rotatably connected thereto. Each of the connector shafts 26 has a first end 26a and a second end 26b. The first end 26a of each connector shaft 26 is connected to the second section 19b of one of the clutch packs 18, and the second end 26b of each connector shaft 26 is connected to a connector plate 28 which is adapted to connect to an axle half-shaft of the vehicle.

Preferably, a ball screw assembly 30 is mounted adjacent each of the clutch packs 18 to selectively apply axial force to the clutch pack 18, thereby locking the first and second sections 19a, 19b of the clutch pack 18 together such that rotational motion is transferred across the clutch pack 18. Thus, rotational motion is transferred from the connector plate 23 through the prop shaft 22 to the central shaft 14, from the central shaft 14 across the clutch packs 18 to the connector shafts 26, and from the connector shafts 26 to the connector plates 28 and to the axle half shafts of the vehicle. The clutch packs 18 could also be actuated pneumatically, hydraulically, or by other suitable methods.

Preferably, each ball screw assembly 30 includes a hollow ball screw 32 mounted within the differential housing 12. The ball screw 32 includes an outer surface having an outwardly facing helical channel 34 formed therein. A ball nut 36 extends circumferentially around the ball screw 32. The ball nut 36 includes an inner surface having an inwardly facing helical channel 38 formed therein. The inwardly facing helical channel 38 of the ball nut 36 and the outwardly facing helical channel 34 of the ball screw 32 define a ball channel.

A plurality of balls 40 are positioned within the ball channel. The balls 40 provide a coupling between the ball screw 32 and the ball nut 36 such that rotational movement of the ball screw 32 and the ball nut 36 relative to one another is translated into axial movement of the ball nut 36 and the ball screw 32 relative to one another. A pair of motors 42 engage the ball nuts 36 to rotationally move the ball nuts 36 relative to the ball screws 32.

Preferably, the ball screw 32 is rotatably and axially fixed within the differential housing 12, and the ball nut 36 is rotatable and axially moveable relative to the differential housing 12. The motor 42 engages the ball nut 36 such that when the motor 42 is activated the ball nut 36 rotates relative to the ball screw 32 and the differential housing 12, thereby moving the ball nut 36 axially such that the ball nut 36 places an axial force onto the clutch pack 18.

Preferably, the motors 42 are electric motors, that each include a brake 44. The brake 44 will allow the motor 42 to be locked into position when the electric power to the motor 42 is cut off. Therefore, if the clutch pack 18 is to be engaged for an extended period of time, the brake can be engaged, and the power to the motor 42 turned off. In this way, the life of the electric motor 42 can be prolonged.

Preferably, each of the electric motors 42 includes a planetary gear set 46 to provide a gear ratio between the motor 42 and the ball nut 36. The planetary gear set 46 includes a ring gear 48, a sun gear 50, and a plurality of planet gears 52 mounted within a planetary carrier 54 and positioned between and interconnecting the sun gear 50 and the ring gear 48. Each electric motor 42 includes a stator 56 and a rotor 58, and the ring gear 48 is mounted to the stator 56 while the sun gear 50 is mounted to the rotor 58.

Figure 3:
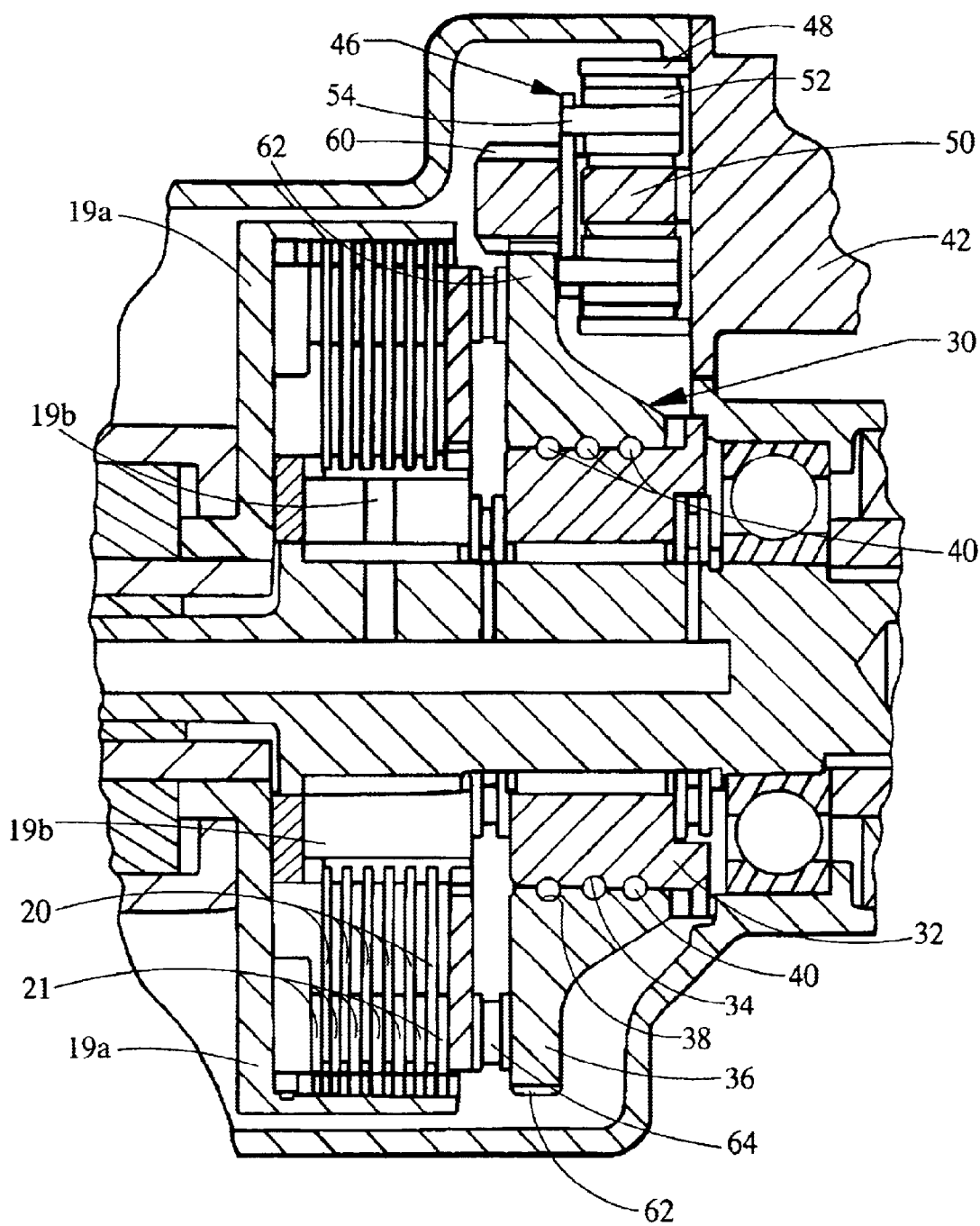
FIG. 3 is an enlarged view of a portion of FIG. 2.

Referring to FIGS. 2 and 3, in a first preferred embodiment, each of the ball nuts 36 includes a first spur gear 60 and each of the motors 42 includes a second spur gear 62. The motors 42 are mounted external to the differential housing 12, and the second spur gear 62 is mounted to the planetary carrier 54 such that as the planetary carrier 54 rotates, the second spur gear 62 will engage the first spur gear 60 and rotate the ball nuts 36. As the ball nuts 36 rotate, the ball nuts 36 move axially relative to the differential housing 12. The ball nuts 36 move axially toward the clutch packs 18 such that the ball nuts 36 apply an axial force to the clutch packs 18, thereby locking the first and second sections 19a, 19b of the clutch packs 18 together.

Figure 4:
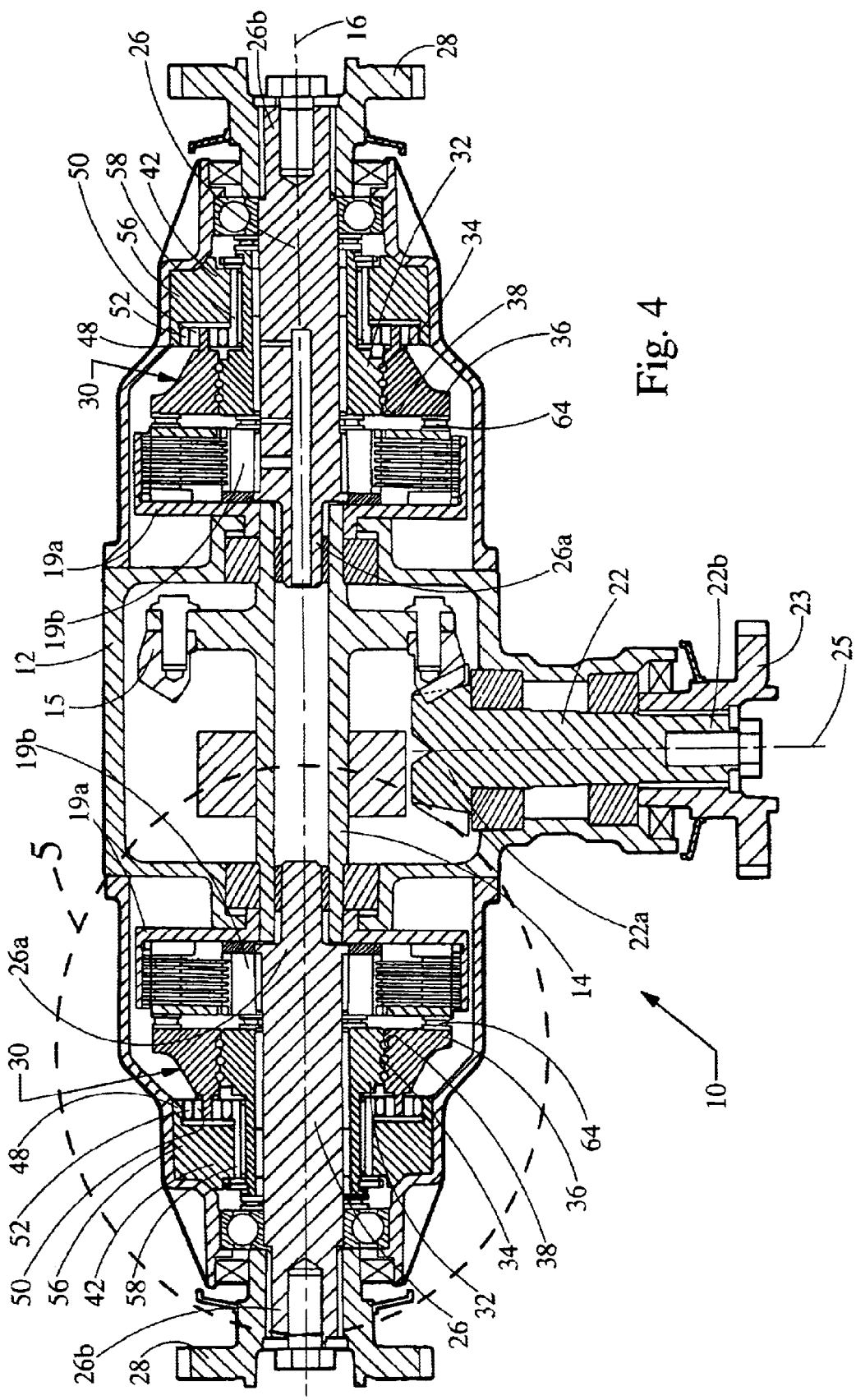
FIG. 4 is a sectional view similar to FIG. 2 of a second preferred embodiment.
Figure 5:
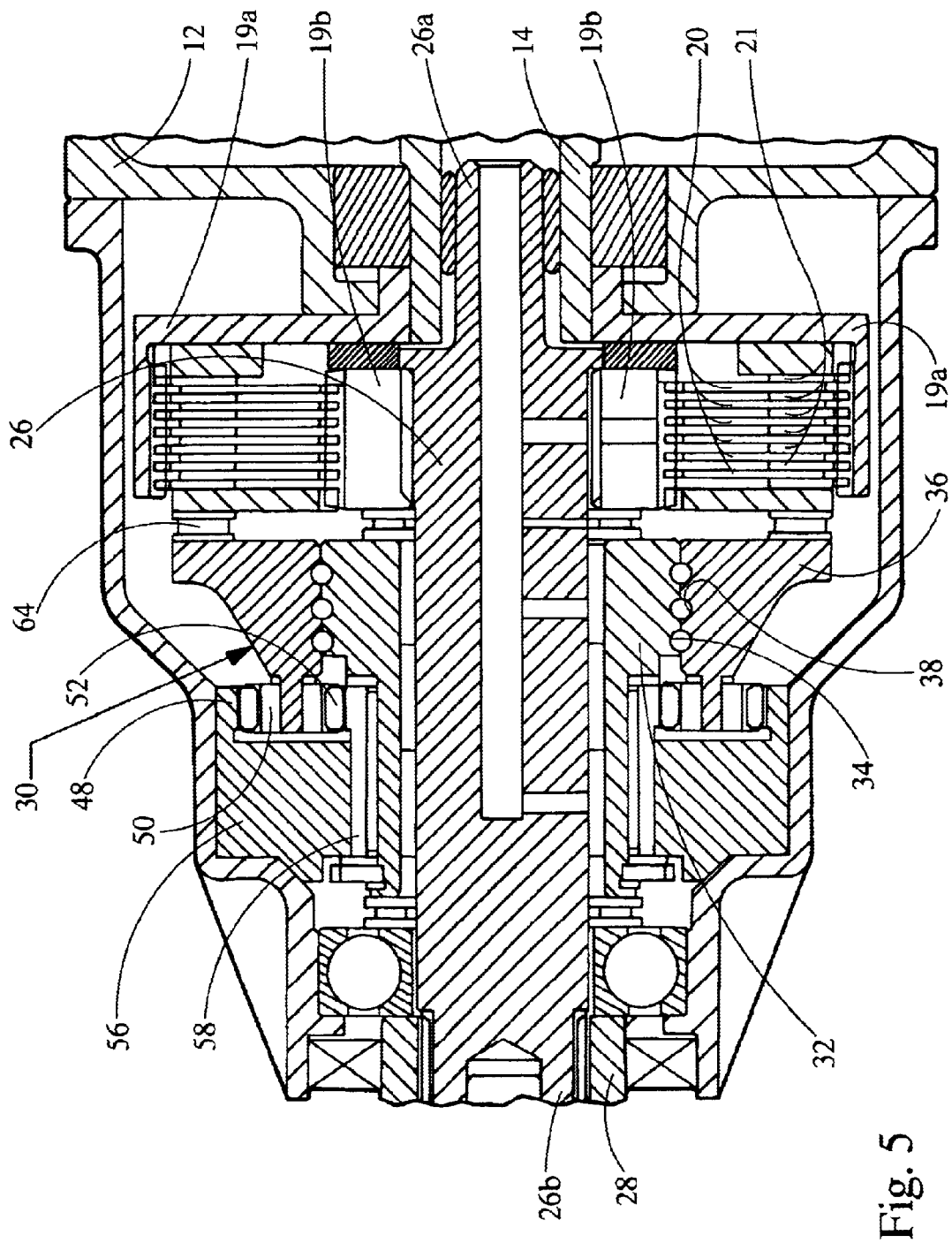
FIG. 5 is an enlarged view of a portion of FIG. 4.

Referring to FIGS. 4 and 5, in a second preferred embodiment, the electric motors 42 are hollow motors which are mounted within the differential housing 12 and extend circumferentially around the connector shafts 26. The ball nuts 36 are attached to the planetary carriers 54 such that as the planetary carriers 54 rotate, the ball nuts 36 rotate about the ball screw 32. As the ball nuts 36 rotate, the ball nuts 36 move axially relative to the differential housing 12. The ball nuts 36 move axially toward the clutch packs 18 such that the ball nuts 36 apply an axial force to the clutch packs 18, thereby locking the first and second sections 19a, 19b of the clutch packs 18 together.

In both the first and second preferred embodiments, the ball screw assemblies 24 provide axial force to the clutch packs 18 that is not dependant upon wear within the clutch packs 18 or within the ball screw assemblies 24. As the plates 20, 21 within the clutch packs 18 wear, the ball screw assemblies 24 can progress further axially toward the clutch packs 18, thereby providing the same axial force to the clutch packs 18 as when the plates 20, 21 were new. The axial force exerted upon the clutch packs 18 is controlled by the motors 42, therefore, the ball screw assemblies 24 will always advance until the axial force being exerted reaches the limitations of the motors 42. Therefore, the differential axle assembly 10 having ball screw assemblies 24 to actuate the clutch packs 18 is self-adjusting as the clutch packs 18 wear.

Additionally, the ball screw assemblies 24 can be reversed. Generally, the ball screw assemblies 24 will reverse only enough to allow relative rotational movement between the first and second plates 20, 21 of the clutch packs 18, thereby allowing slip between the central shaft 14 and the axle half shafts. However, under certain circumstances, it may be desirable to back the ball screw assemblies 24 away from the clutch packs 18 even further to allow the plates 20, 21 within the clutch packs 18 to cool. This is easily accomplished with the ball screw assemblies 24.

Further, the ball screw assemblies 24 use many balls 40. Preferably, approximately fifty balls 40 are positioned within the ball channel. Typically in a ball ramp type actuator there are three or four ball bearings supporting the entire axial load. The ball screw assembly 24 provides a larger number of balls 40 to support the load, resulting in more even loading and less wear within the ball screw assemblies 24.

Preferably, a thrust bearing 64 is positioned between each of the ball screw assemblies 24 and the clutch packs 18. The thrust bearings 64 will allow axial force to be transferred from the ball screw assemblies 24 to the clutch packs 18 while allowing the ball nuts 32 to rotate relative to the clutch packs 18.

The foregoing discussion discloses and describes two preferred embodiments of the invention. One skilled in the art will readily recognize from such discussion, and from the accompanying drawings and claims, that changes and modifications can be made to the invention without departing from the scope of the invention as defined in the following claims. The invention has been described in an illustrative manner, and it is to be understood that the terminology which has been used is intended to be in the nature of words of description rather than of limitation.

What is claimed is:

1. An axle differential assembly for an automotive vehicle comprising:

a differential housing;

a central shaft rotatably mounted within said differential housing having opposing first and second ends and including a ting gear mounted thereon, said central shaft defining a central axis of said axle differential assembly;

a pair of clutch packs, one of said clutch packs mounted to each end of said central shaft, each of said clutch packs adapted to connect to an end of an axle half shaft and adapted to selectively transfer rotational motion from said central shaft, across said clutch packs, and to the axle half shafts; and a pair of actuators, each actuator adapted to exert an axial force onto one of said clutch packs, each of said actuators being actuated by an electric motor, each of said electric motors Including a stator and a rotor, and including a brake, such that said electric motors can be locked in position to maintain the position of said actuators, thereby maintaining axial force onto said clutch packs when no power is supplied to said electric motors.

2. The axle differential assembly of claim 1 wherein said actuators are ball screw assemblies mounted within said differential housing, one of said actuators being mounted adjacent each of said clutch packs, each of said ball screw assemblies adapted to selectively apply axial force to one of said clutch packs, thereby actuating said clutch packs such that rotational motion is transferred across said clutch packs.

3. The axle differential assembly of claim 2 further including a prop shaft rotatably mounted within said differential housing and defining an axis which is substantially perpendicular to said central axis, said prop shaft including a first end and a second end, said first end including a connector plate adapted to connect said prop shaft to a drive shaft of the vehicle and said second end engaging said ring gear of said central shaft such that rotational motion of the vehicle drive shaft is transferred through said prop shaft to said central shaft.

4. The axle differential assembly of claim 3 further including a pair of connector shafts rotatably mounted within said differential housing, each of said connector shafts having a first end and a second end, said first end of each of said connector shafts engaging one of said clutch packs, and said second end of each of said connector shafts including a connector plate adapted to connect said connector shafts to an axle half shaft of the vehicle, such that when said clutch packs are actuated, rotational motion is transferred from said central shaft to each of said clutch packs, across said clutch packs to said connector shafts, and through said connector shafts to the axle half shafts of the vehicle.

5. The axle differential assembly of claim 4 wherein each of said clutch packs includes a first section that is rotatably connected to said central shaft, a second section that is rotatably connected to one of said connector shafts, a plurality of first clutch plates, and a plurality of second clutch plates, each of said first clutch plates having a plurality of teeth formed on an outer diameter thereof, said teeth of said first clutch plates engaging corresponding teeth formed within an inner diameter of said first section, each of said second clutch plates having a plurality of teeth formed on an inner diameter thereof, said teeth of said second clutch plates engaging corresponding teeth formed within an outer diameter of said second section, said first and second clutch plates being interlaced with one another such that when said first and second clutch plates are compressed against one another, friction between said plates will prevent said first and second sections from rotating relative to one another such that rotational motion is transferred from said central shaft to said connector shafts across said clutch packs.

6. The differential assembly of claim 5 wherein each of said ball screw assemblies includes:

a hollow ball screw mounted within said differential housing, about one of said connector shafts, said ball screw including an outer surface having an outwardly facing helical channel formed therein;

a hollow ball nut extending circumferentially around said ball screw, said ball nut including an inner surface having an inwardly facing helical channel formed therein;

a ball channel defined by said Inwardly facing helical channel and said outwardly facing helical channel; and a plurality of ball bearings positioned within said ball channel, thereby coupling said ball screw and said ball nut such that rotational movement of said ball screw and said ball nut relative to one another is translated into axial movement of said ball nut and said ball screw relative to one another;

one of said electric motors adapted to engage said ball nut to rotationally move said ball nut relative to said ball screw.

7. The differential assembly of claim 6 wherein each of said ball screws is rotatably and axially fixed within said differential housing and each of said ball nuts is rotatable and axially moveable relative to said differential housing, said electric motors engaging said ball nuts such that when said electric motors are activated said ball nuts rotate relative to said ball screws and said differential housing, thereby moving said ball nuts axially relative to said differential housing such that said ball nuts apply an axial force to said clutch packs and rotationally connecting said connector shafts to said central shaft, thereby transferring rotational motion from said central shaft to said first sections of said clutch packs, through said clutch packs to said connector shafts, and from said connector shafts to said connector plates.

8. The differential assembly of claim 7 wherein each of said electric motors further includes a planetary gear set having a ring gear, a sun gear and a plurality of planet gears secured within a planetary carrier between and interconnecting said ring gear and said sun gear, said ring gear being attached to said stator, and said sun gear being attached to said rotor.

9. The differential assembly of claim 8 wherein each of said electric motors is a hollow motor mounted within said differential housing and said ball nuts are attached to said planetary carrier such that rotational movement of said planetary carrier rotates said ball nuts relative to said differential housing.

10. The differential assembly of claim 8 wherein each of said ball nuts includes a first spur gear, and said electric motors include a second spur gear mounted to said planetary carrier and engaging said first spur gear such that rotational movement of said planetary carrier rotates said ball nut relative to said differential housing.

11. The differential assembly of claim 1 further including a thrust bearing positioned between said ball screw assembly and said clutch pack.

* * * * *

UNITED STATES PATENT AND TRADEMARK OFFICE
CERTIFICATE OF CORRECTION

PATENT NO. : 6,711,968 B2
DATED : March 30, 2004
INVENTOR(S) : Richard M. Krzesicki et al.

It is certified that error appears in the above-identified patent and that said Letters Patent is hereby corrected as shown below:

Title page,
Item [57], ABSTRACT,
Line 11, delete "adapte" and substitute -- adapted -- in its place.

Column 4,
Line 35, after "including a" delete "ting" and substitute -- ring -- in its place.
Line 48, delete "Including" and substitute -- including -- in its place.

Column 5,
Line 46, delete "Inwardly" and substitute -- inwardly -- in its place.

Signed and Sealed this

Twenty-first Day of September, 2004

JON W. DUDAS
*Director of the United States Patent and Trademark Office*